United States Patent
Maier et al.

(10) Patent No.: US 9,988,111 B2
(45) Date of Patent: Jun. 5, 2018

(54) SWING ARM IDLER RISE HEIGHT ADJUSTMENT

(71) Applicant: Caterpillar Inc., Peoria, IL (US)

(72) Inventors: Ronald Jerome Maier, Raleigh, NC (US); John Bradley Edelin, Raleigh, NC (US); Dewakar Venkata Jonnakuti, Raleigh, NC (US); Sanjog Suresh Mankar, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 128 days.

(21) Appl. No.: 15/228,105

(22) Filed: Aug. 4, 2016

(65) Prior Publication Data

US 2018/0037281 A1   Feb. 8, 2018

(51) Int. Cl.
  *B62D 55/15* (2006.01)
  *B62D 55/30* (2006.01)
  *E02F 3/76* (2006.01)

(52) U.S. Cl.
  CPC ........... *B62D 55/305* (2013.01); *B62D 55/15* (2013.01); *E02F 3/7609* (2013.01)

(58) Field of Classification Search
  CPC ...... B62D 55/305; B62D 55/15; E02F 3/7605
  USPC ....... 305/143, 145, 146, 147, 151, 153, 154, 305/155
  See application file for complete search history.

(56) References Cited

U.S. PATENT DOCUMENTS

| | | | |
|---|---|---|---|
| 1,919,315 A | 7/1933 | Baker et al. | |
| 3,156,505 A | 11/1964 | Hubert | |
| 3,332,725 A * | 7/1967 | Reinsma | B62D 55/305 305/146 |
| 3,899,218 A * | 8/1975 | Blomstrom | B62D 55/08 305/60 |
| 3,901,563 A * | 8/1975 | Day | B62D 55/30 305/146 |
| 4,101,177 A | 7/1978 | Bianchi et al. | |
| 4,650,260 A * | 3/1987 | Satzler | B62D 55/305 305/152 |
| 4,738,494 A | 4/1988 | Bedis | |
| 5,927,412 A | 7/1999 | Crabb | |
| 6,273,530 B1 | 8/2001 | Johnson et al. | |

(Continued)

FOREIGN PATENT DOCUMENTS

| CN | 102514641 A | 6/2012 |
|---|---|---|
| JP | 4121105 B2 | 7/2008 |

*Primary Examiner* — S. Joseph Morano
*Assistant Examiner* — Jean Charleston
(74) *Attorney, Agent, or Firm* — Miller, Matthias & Hull

(57) ABSTRACT

An idler wheel recoil assembly mounts an idler wheel to a roller frame of an undercarriage of a track-type machine. The idler wheel recoil assembly includes a recoil shaft and spring mounted on the roller frame for reciprocal movement of the recoil shaft, and a swing arm pivotally connected to a guard mounted on the roller frame by a guard mounting assembly and having the idler wheel rotatably mounted thereon. A yoke is pivotally connected between the recoil shaft and the swing arm. A guard mounting assembly connects the guard to the roller frame of the undercarriage and has a plurality of mounting positions for securing the guard to the roller frame, with an idler rise height of the idler wheel relative to the roller frame being different when the guard is secured to the roller frame in each of the plurality of mounting positions of the guard mounting assembly.

20 Claims, 6 Drawing Sheets

(56) References Cited

U.S. PATENT DOCUMENTS 6,276,768 B1 * 8/2001 Miller .................. B62D 55/30
305/144
7,597,161 B2 10/2009 Brazier

* cited by examiner

US 9,988,111 B2

SWING ARM IDLER RISE HEIGHT ADJUSTMENT

TECHNICAL FIELD

The present disclosure relates generally to machines having track-type undercarriages and, more particularly, to adjustment of an idler rise height of an idler wheel and an associated swing arm of a recoil assembly mounting the idler wheel to a roller frame of an undercarriage.

BACKGROUND

Track-type machines are used in a wide variety of rugged service environments. The use of ground engaging tracks rather than wheels can provide enhanced traction, stability, and robustness to a machine system over what might otherwise be available. A typical undercarriage system in a track-type machine includes a plurality of track shoes coupled together in an endless roller track chain by way of a set of track links, and extending about a drive sprocket and one or more rotatable idler wheels. The track assembly provides better mobility on uneven ground and typically renders excellent traction while spreading the weight of the machine over a large area. Mining, construction, landfills, forestry, and still other service environments are notable examples of where track-type machines are advantageously used.

The idler wheel at the front of the undercarriage can have an adjustable position to control the tension in the roller track. Also, the front idler wheel may be mounted on a frame of the undercarriage by a recoil assembly that allows the idler wheel to deflect rearward when impacted by an obstacle in the path of the track-type machine to prevent damage to the undercarriage. Recoil assemblies for idler wheels of undercarriages are known in the art. For example, U.S. Pat. No. 3,899,218 issued to Blomstrom et al. on Aug. 12, 1975, entitled "Combined Integral Component Enclosure and Track Roller Frame," discloses a track roller frame with a front idler connected to a box beam of the track roller frame by a carriage between a pivot pin about which the front idler rotates and a pivot pin about which the carriage rotates. A rearward arm of the carriage is pivotally connected to a yoke assembly that in turn is connected to a rod of a recoil mechanism. This arrangement applies proper tension to the roller track and allows obstacles in the path of movement to be traversed with a minimum shock to the undercarriage.

In track-type machines such as finish grading machines, an idler rise height of the idler wheel can affect the smoothness of the ride of the machine and its ability to smoothly grade a work surface. When the idler rise height is too high, a track roller directly behind the idler wheel may do most of the work of getting grousers extending from the links or shoes of the roller track penetrated into the work surface. Moreover, the total track length in contact with the work surface is shortened, which can cause the track-type machine to lose balance and lead to poor fine grading performance. When the idler rise height is too low, the idler wheel must do all the work of getting the grousers to penetrate the work surface. Also, the roller track can have a tendency to buckle between the idler wheel and the first track roller, which can cause the track-type machine to bounce up and down each time a grouser passes under the idler wheel and again lead to poor fine grading performance. When the idler rise height is set correctly, an optimum total track length on the work surface is achieved, and the idler wheel begins penetrating the grousers into the work surface and the track roller behind the idler wheel completes the grouser penetration, which leads to optimum finish grading performance.

SUMMARY OF THE DISCLOSURE

In one aspect of the present disclosure, an idler wheel recoil assembly for mounting an idler wheel to a roller frame is disclosed. The roller frame may be part of an undercarriage of a track-type machine having an endless roller track formed by a plurality of track links. The idler wheel recoil assembly includes a recoil shaft slidably mounted on the roller frame for reciprocal linear movement parallel to a longitudinal axis of the undercarriage, a recoil spring coupled to the roller frame and to the recoil shaft and biasing the recoil shaft toward a forward direction of the track-type machine, and a yoke having a first yoke end and a second yoke end, the first yoke end pivotally connected to the recoil shaft by a recoil-yoke shaft. The idler wheel recoil assembly further includes a swing arm having a first swing arm end and a second swing arm end, the first swing arm end pivotally connected to the second yoke end of the yoke by a yoke-swing arm shaft, and having the idler wheel pivotally connected thereto by an idler shaft, a guard pivotally connected to the second swing arm end of the swing arm by a swing arm-guard shaft, and a guard mounting assembly connecting the guard to the roller frame of the undercarriage. The guard mounting assembly has a plurality of mounting positions for securing the guard to the roller frame and maintaining the guard in a fixed position relative to the roller frame, with an idler rise height of the idler wheel relative to the roller frame being different when the guard is secured to the roller frame in each of the plurality of mounting positions of the guard mounting assembly.

In another aspect of the present disclosure, a guard mounting assembly is disclosed. The guard mounting assembly mounts an idler wheel to a roller frame of an undercarriage of a track-type machine having an endless roller track formed by a plurality of track links, wherein the idler wheel is pivotally connected to a swing arm of a recoil assembly by an idler shaft, with the swing arm having a first swing arm end pivotally connected to a yoke of the recoil assembly and a second swing arm end. The guard mounting assembly includes a guard pivotally connected to the second swing arm end of the swing arm by a swing arm-guard shaft, at least one guard shim, and a plurality of fasteners securing the guard to the roller frame with the at least one guard shim disposed there between. An idler rise height of the idler wheel increases when one of the at least one guard shim is removed and a guard-frame distance between the guard and the roller frame decreases.

In a further aspect of the present disclosure, a guard mounting assembly is disclosed. The guard mounting assembly mounts an idler wheel to a roller frame of an undercarriage of a track-type machine having an endless roller track formed by a plurality of track links, wherein the idler wheel is pivotally connected to a swing arm of a recoil assembly by an idler shaft, with the swing arm having a first swing arm end pivotally connected to a yoke of the recoil assembly and a second swing arm end. The guard mounting assembly includes a guard pivotally connected to the second swing arm end of the swing arm by a swing arm-guard shaft and having a plurality of guard mounting holes there through, a plurality of frame mounting holes through the roller frame, wherein the plurality of guard mounting holes are positioned to align with the plurality of frame mounting holes in multiple positions of the guard relative to the roller frame, and a plurality of fasteners for securing the guard to the roller frame. Each of the plurality of fasteners is inserted through an aligned pair of one of the plurality of frame mounting holes and one of the plurality of guard mounting holes. The idler wheel is disposed at a first idler rise height relative to the roller frame when the guard is mounted to the roller frame in a first guard position with the plurality of guard mounting holes aligned with the plurality of frame mounting holes, and the idler wheel is disposed at a second idler rise height relative to the roller frame that is higher than the first idler rise height when the guard is mounted to the roller frame in a second guard position with the plurality of guard mounting holes aligned with the plurality of frame mounting holes.

Additional aspects are defined by the claims of this patent.

DETAILED DESCRIPTION

Figure 1:
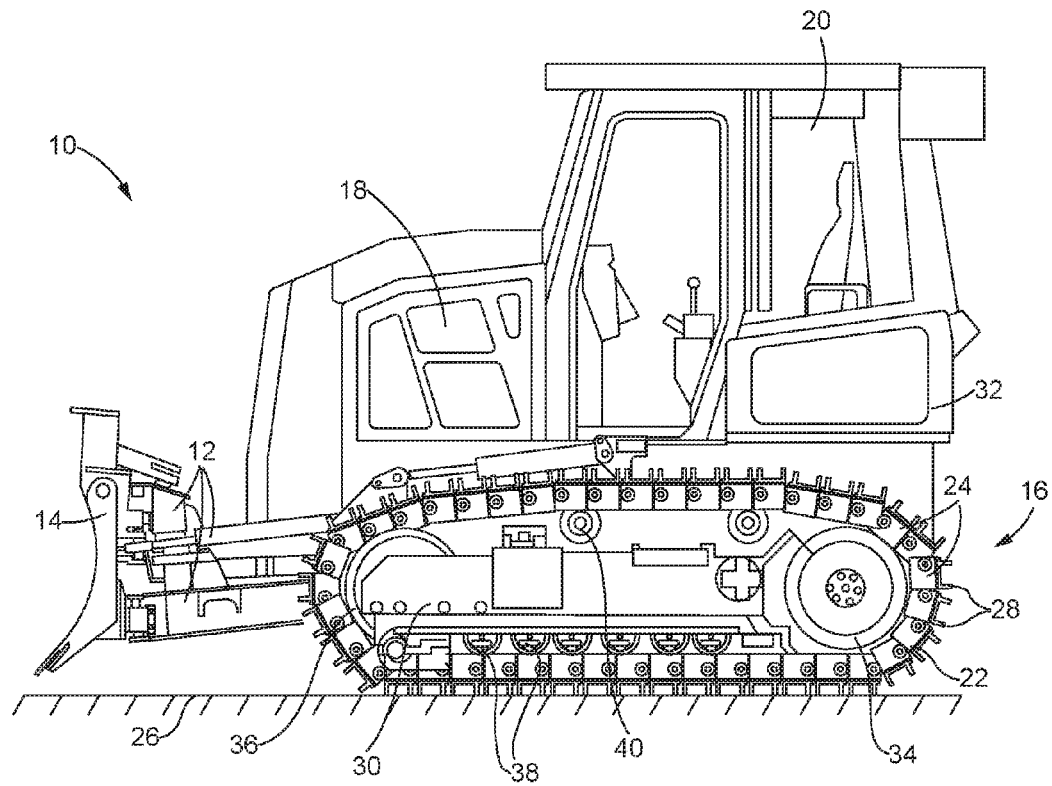
FIG. 1 is a side elevation view of a track-type machine having an idler wheel recoil assembly in accordance with the present disclosure.

Referring to FIG. 1, a track-type machine 10 may embody a mobile machine that performs some type of operation associated with an industry such as mining, construction, farming, transportation, waste handling or any other industry known in the art. For example, the machine 10 may be an earth moving machine such as a small track-type tractor for performing finish grading. The machine 10 may include an implement system 12 configured to adjust the position or orientation of an implement such as a tractor blade 14, a drive system in the form of a track undercarriage 16 for propelling the machine 10, a power source 18 that provides power to the implement system 12 and the undercarriage 16, and an operator station 20 for operator control of the implement system 12 and the undercarriage 16. Though a small track-type tractor is illustrated, the idler wheels and recoil assemblies disclosed herein may be implemented in any other types of machines having an undercarriage, such as material loaders, excavators and the like.

The power source 18 may embody an engine such as, for example, a diesel engine, a gasoline engine, a gaseous fuel-powered engine or any other type of combustion engine known in the art. It is contemplated that the power source 18 may alternatively embody a non-combustion source of power such as a fuel cell, a power storage device, or another source known in the art. The power source 18 may produce a mechanical or electrical power output that may then be converted to hydraulic or pneumatic power for moving the implement system 12, and converted into drive torque by an appropriate power transmission assembly (not shown) to drive a pair of roller tracks 22 (left side track shown) of the undercarriage 16. The roller tracks 22 may be formed from a series of track links or shoes 24 connected end-to-end to form an endless roller track loop that is driven to propel the machine 10 over a work surface 26. Each track link 24 may having one or more grousers 28 extending outwardly therefrom to engage the work surface 26 and provide additional traction and stability for the machine 10 as it operates on the work surface 26.

The undercarriage 16 may be a standard track drive system known in the art and includes a roller frame 30 connected to a body 32 of the machine 10 and having a drive sprocket 34 pivotally connected at the rear of the undercarriage 16 and an idler wheel 36 connected at the front of the undercarriage 16 by a recoil assembly (not shown in FIG. 1) such as that illustrated and discussed further hereinafter. The roller track 22 is supported by the drive sprocket 34 and the idler wheel 36, but may not be taught so that the roller track 22 may move to provide stability for the machine 10 as it traverses uneven terrain. Track rollers 38 pivotally connected to the roller frame 30 support the machine 10 on the work surface 26. Above the roller frame 30, the portion of the roller track 22 between the drive sprocket 34 and front idler wheel 36 is supported by at least one carrier roller 40. The carrier roller 40 is rotatably mounted to the roller frame 30 so that the carrier roller 40 rotates as the roller track 22 moves between the drive sprocket 34 and the idler wheel 36. The undercarriage 16 illustrated herein is a low sprocket-type undercarriage, but those skilled in the art will understand that the concepts disclosed herein may be implemented in other types of undercarriage such as elevated sprocket undercarriages having the drive sprocket 34 mounted above the roller frame 30 and idler wheels 36 at the front and rear of the roller frame 30.

Figure 2:
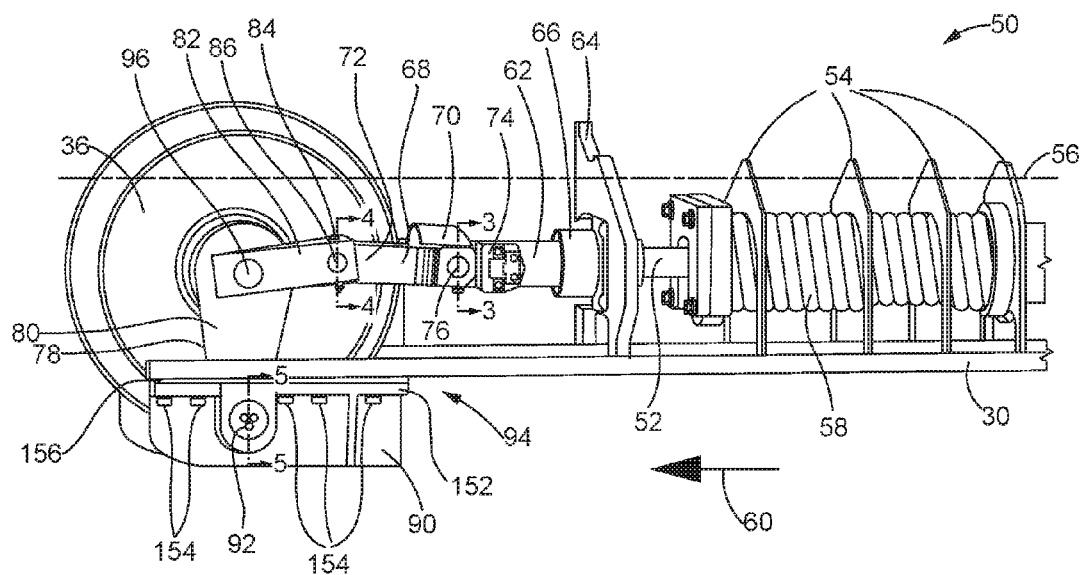
FIG. 2 is a side view of an embodiment of an idler recoil assembly for an idler wheel in accordance with the present disclosure of the track-type machine of FIG. 1.

FIG. 2 illustrates an embodiment of an idler wheel recoil assembly 50 for mounting the idler wheel 36 to the roller frame 30 of the undercarriage 16. In the illustrated embodiment, the idler wheel recoil assembly 50 includes a recoil shaft 52 slidably mounted on the roller frame 30 by brackets 54 for reciprocal linear movement parallel to a longitudinal axis 56 of the undercarriage 16. A recoil spring 58 may encircle the recoil shaft 52 and be coupled between one of the brackets 54 of the roller frame 30 and the recoil shaft 52. The recoil spring 58 may bias the recoil shaft 52 toward a forward direction of the track-type machine 10 indicated by an arrow 60. If necessary, the recoil spring 58 and a corresponding portion of the recoil shaft 52 may be enclosed within a cylindrical housing (not shown) mounted to the brackets 54 to shield the recoil spring 58 from dirt and debris.

The recoil shaft 52 may include a track adjustment cylinder 62 having a variable track adjustment cylinder length so that the recoil shaft 52 has a variable recoil shaft length. The track adjustment cylinder 62 may be a hydraulic cylinder to which hydraulic fluid may be added or removed to increase or decrease, respectively, the track adjustment cylinder length and, correspondingly, the recoil shaft length. Varying the recoil shaft length may change the position of the idler wheel 36 for adjustment of tension in the roller track 22 by decreasing the recoil shaft length to reduce the tension and increasing the recoil shaft length to increase the tension. The tension in the roller track 22 may be monitored over the course of using the machine 10 in the field, and the track adjustment cylinder length may be adjusted accordingly by adding and removing hydraulic fluid to and from the track adjustment cylinder 62 to maintain a desired tension. A forward bracket 64 of the roller frame 30 may include a track adjustment cylinder guide 66 encircling the track adjustment cylinder 62 to further constrain the recoil shaft 52 and the track adjustment cylinder to reciprocal linear movement parallel to the longitudinal axis 56.

The idler wheel recoil assembly 50 further includes a yoke 68 having a first yoke end 70 and a second yoke end 72. The first yoke end 70 is pivotally connected to a forward end 74 of the track adjustment cylinder 66 by a recoil-yoke shaft 76 so that the yoke 68 can rotate relative to the recoil shaft 52 when the recoil shaft 52 moves forward and rearward. A swing arm 78 may include a swing arm body 80 and a rearward extending swing arm lever 82 that are rigidly connected to form and single unitary component. A first swing arm end 84 at the swing arm lever 82 is pivotally connected to the second yoke end 72 of the yoke 68 by a yoke-swing arm shaft 86. A second swing arm end 88 at the swing arm body 80 is pivotally connected to a guard 90 by a swing arm-guard shaft 92. The guard 90 is mounted to the roller frame 30 by a guard mounting assembly 94 that is illustrated and described in greater detail below. In the illustrated embodiment, the idler wheel 36 is pivotally mounted to the swing arm 78 by an idler shaft 96 positioned proximate an intersection of the swing arm body 80 and the swing arm lever 82.

At the points of connection in the idler wheel recoil assembly 50 provided by the shafts 76, 86, 92, the relative movement of the connected parts creates friction causing wear of the parts over time. In previously-known recoil assemblies, metal bearings are provided about pivot shafts at interfaces between the moving parts, and lubricant is provided to reduce the friction between the bearings and the parts. Over time, lubricant can leak out of the joints and must be replenished, so access points are provided for adding lubricant to the joints. Typically, the space surrounding the recoil assembly is cramped and can make it difficult to use the access points to add lubricant. In the present embodiment, the idler wheel recoil assembly 50 can eliminate the need for lubricant and the corresponding access points by implementing composite bearings at the pivot joints that do not require lubricant and are capable of lasting for the entire useful life of the machine 10 without replacement.

Figure 3:
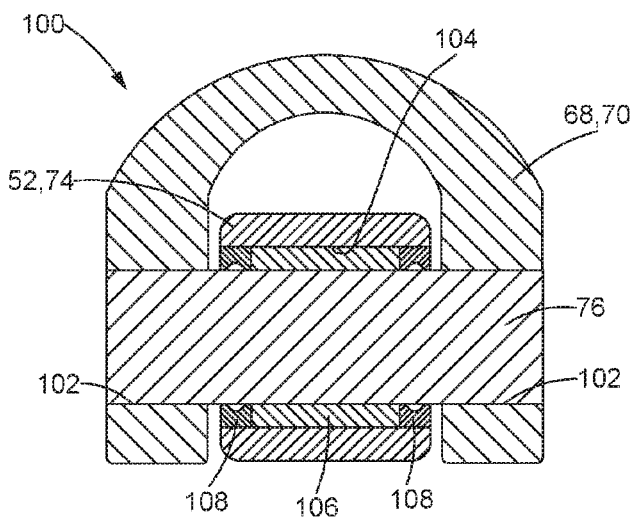
FIG. 3 is a cross-sectional view taken through line 3-3 of FIG. 2 of a connection of a track adjustment cylinder to a first yoke end of a yoke.

FIG. 3 is a cross-sectional view of a recoil-yoke pivot joint 100 formed by the forward end 74 of the recoil shaft 52, the first yoke end 70 of the yoke 68, and the recoil-yoke shaft 76. The recoil-yoke shaft 76 is inserted through first yoke openings 102 and a track adjustment cylinder opening 104 to form the recoil-yoke pivot joint 100. The recoil-yoke shaft 76 may be secured within the first yoke openings 102 against relative motion with respect to the yoke 68 by any appropriate means, such as press fitting the recoil-yoke shaft 76 into first yoke openings 102 or securing the recoil-yoke shaft 76 with welds, fasteners or other appropriate connection mechanisms. The recoil-yoke pivot joint 100 further includes a recoil-yoke composite bearing 106 in the form of a cylindrical sleeve bushing mounted on the recoil-yoke shaft 76 between the recoil-yoke shaft 76 and the track adjustment cylinder opening 104. The recoil-yoke composite bearing 106 may be fabricated from any appropriate composite material, such as polytetrafluoroethylene (PTFE), woven fiberglass with a liner, or the like, that is capable of bearing the radial loads created between the recoil-yoke shaft 76 and the recoil shaft 52 and reducing friction caused by the relative movement there between without the need for lubricant. The recoil-yoke composite bearing 106 may further be configured to withstand the loading without requiring replacement during the useful life of the undercarriage 16. To prevent dirt and debris from entering the interfaces between the recoil-yoke shaft 76, the track adjustment cylinder opening 104 and the recoil-yoke composite bearing 106, the recoil-yoke pivot joint 100 may further include recoil-yoke seals 108 disposed on the recoil-yoke shaft 76 on either side of the recoil-yoke composite bearing 106, and between the recoil-yoke shaft 76 and the track adjustment cylinder opening 104.

Figure 4:
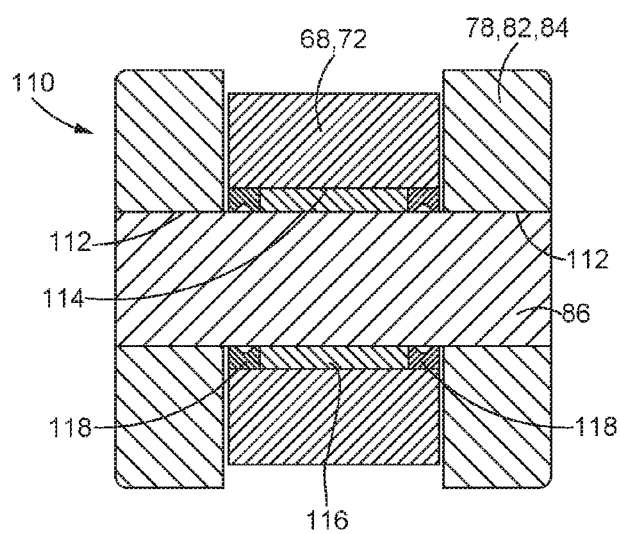
FIG. 4 is a cross-sectional view taken through line 4-4 of FIG. 2 of a connection of a second yoke end of the yoke to a first swing arm end of a swing arm.

Similar to FIG. 3, FIG. 4 is a cross-sectional view of a yoke-swing arm pivot joint 110 formed by the second yoke end 72 of the yoke 68, the first swing arm end 84 of the swing arm 78, and the yoke-swing arm shaft 86. The yoke-swing arm shaft 86 is inserted through first swing arm openings 112 and a second yoke opening 114 to form the yoke-swing arm pivot joint 110. The yoke-swing arm shaft 86 may be secured within the first swing arm openings 112 in a similar manner as the recoil-yoke shaft 76 is secured within the first yoke openings 102 against relative motion as discussed above. The yoke-swing arm pivot joint 110 further includes a yoke-swing arm composite bearing 116 mounted on the yoke-swing arm shaft 86 between the yoke-swing arm shaft 86 and the second yoke opening 114. The yoke-swing arm composite bearing 116 may be a cylindrical sleeve bushing fabricated from an appropriate composite material, such as those described above for the recoil-yoke composite bearing 106. The yoke-swing arm pivot joint 110 further includes yoke-swing arm seals 118 disposed on the yoke-swing arm shaft 86 on either side of the yoke-swing arm composite bearing 116.

Figure 5:
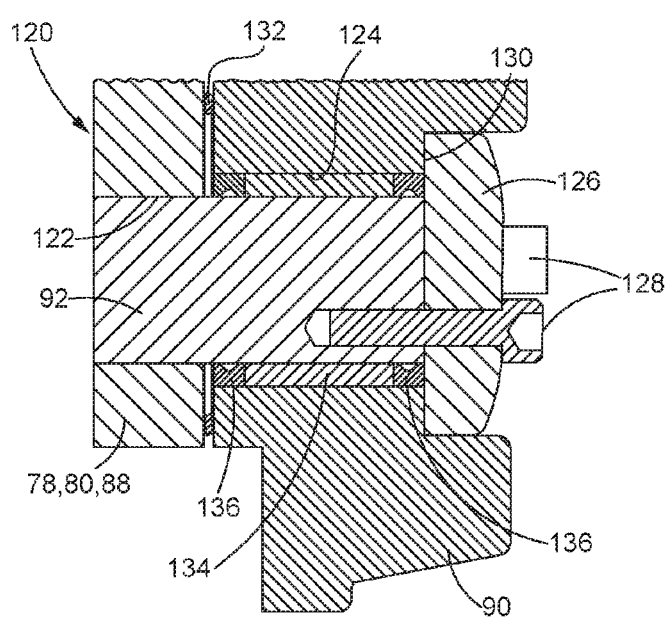
FIG. 5 is a cross-sectional view taken through line 5-5 of FIG. 2 of a connection of a second swing arm end to a guard of the idler wheel recoil assembly.

FIG. 5 is a cross-sectional view of a swing arm-guard pivot joint 120 formed by the second swing arm end 88 of the swing arm 78, the guard 90, and the swing arm-guard shaft 92. The swing arm-guard shaft 92 is inserted through a second swing arm opening 122 and a guard opening 124 to form the swing arm-guard pivot joint 120. The swing arm-guard shaft 92 may be secured within the second swing arm opening 122 in a similar manner as discussed above for the shafts 76, 86. The swing arm-guard shaft 92 may be retained within the guard opening 124 by a guard shaft cap 126 secured to an end of the swing arm-guard shaft 92 by fasteners 128 and abutting a guard shoulder 130 defined by the guard opening 124 to prevent the swing arm-guard shaft 92 from being pulled through the guard opening 124. A spring washer 132 in the form of a Belleville spring may be disposed around the swing arm-guard shaft 92 and between the second swing arm end 88 and the guard 90 to bias the guard shoulder 130 into engagement with the guard shaft cap 126 and to prevent dirt and debris from entering the swing arm-guard pivot joint 120.

The swing arm-guard pivot joint 120 further includes a swing arm-guard composite bearing 134 mounted on the swing arm-guard shaft 92 between the swing arm-guard shaft 92 and the guard opening 124. The swing arm-guard composite bearing 134 may be a cylindrical sleeve bushing fabricated from an appropriate composite material, such as those described above for the recoil-yoke composite bearing 106 and the yoke-swing arm composite bearing 116. The swing arm-guard pivot joint 120 further includes yoke-swing arm seals 136 disposed on the swing arm-guard shaft 92 on either side of the swing arm-guard composite bearing 134.

The roller frame 30, the recoil shaft 52, the yoke 68 and the swing arm 78 constitute a four-bar linkage in the form of a slider-crank mechanism for absorbing impacts to the idler wheel 36 by obstructions in the path of the machine 10. The idler wheel recoil assembly 50 is illustrated in a normal or extended position in FIG. 6. In this position, the recoil spring 58 (not shown) has biased the recoil shaft 52 and the track adjustment cylinder 62 fully in the forward direction 60. The linear movement of the recoil shaft 52 is transmitted by the yoke 68 to the swing arm 78 and converted into rotational movement of the swing arm 78 and the idler wheel 36 about the swing arm-guard shaft 92 in the counterclockwise direction from the viewpoint of FIG. 6. In the illustrated embodiment, the swing arm 78 is rotated forward past a position where the idler shaft 96 is disposed directly above the swing arm-guard shaft 92. The extended position of the swing arm 78 and the idler wheel 36 can be adjusted as necessary by adding or draining hydraulic fluid to or from the track adjustment cylinder 62 to create a desired tension in the roller track 22.

Figure 6:
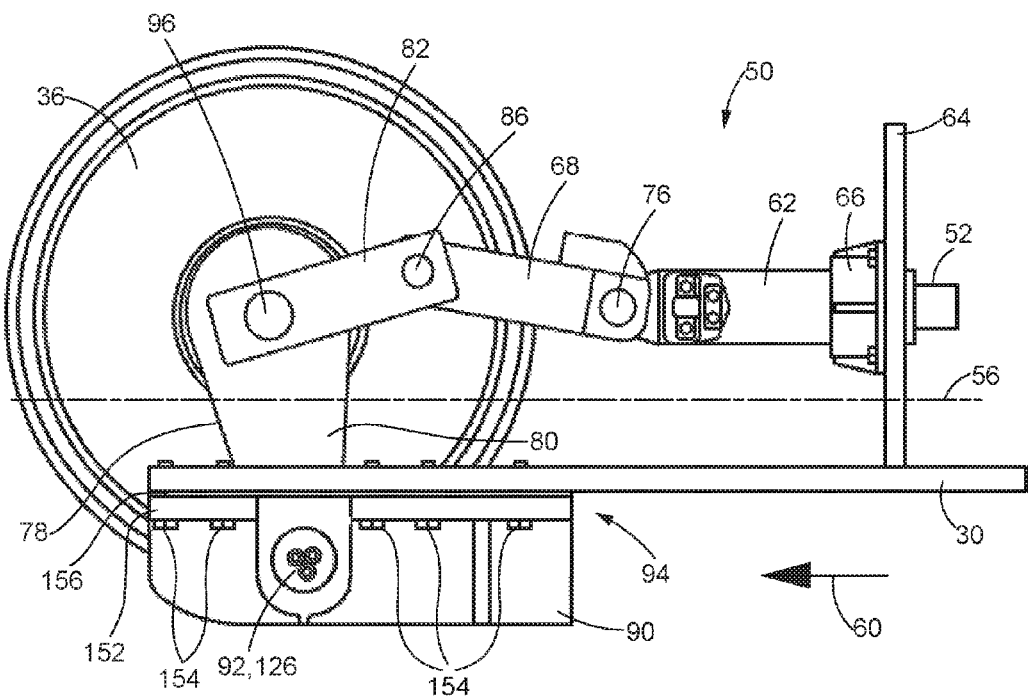
FIG. 6 is a side view of the idler wheel and the idler wheel recoil assembly of FIG. 2 in a normal or extended position.
Figure 7:
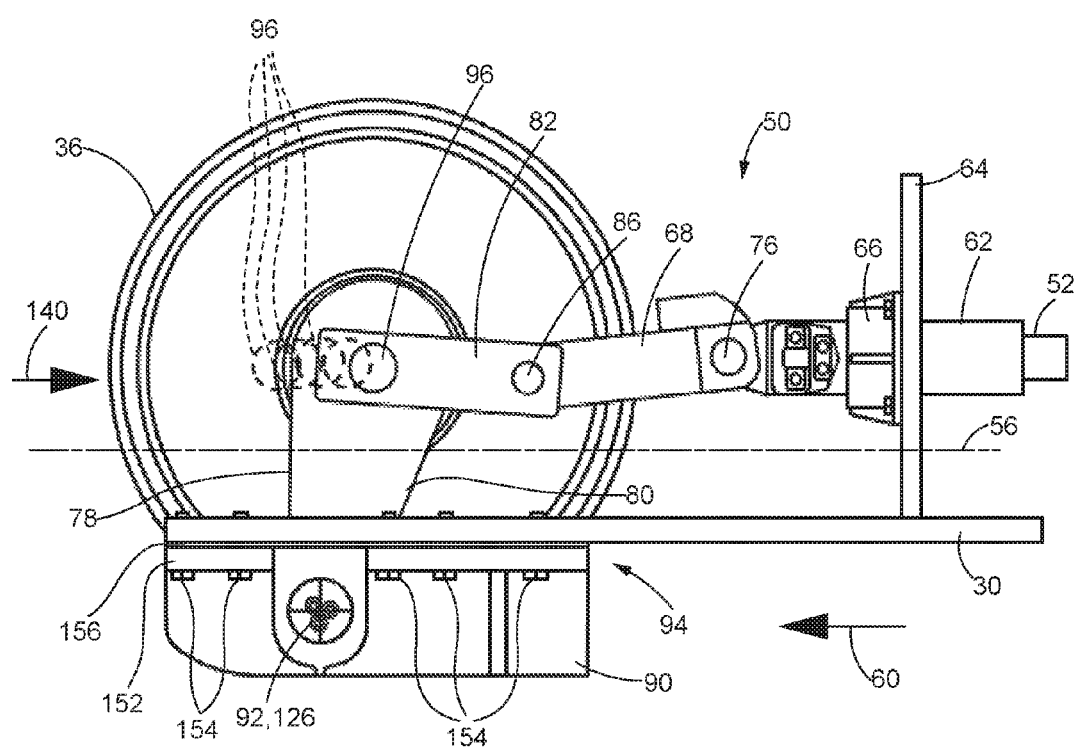
FIG. 7 is a side view of the idler wheel and the idler wheel recoil assembly of FIG. 2 in a recoiled position.

FIG. 7 illustrates the idler wheel recoil assembly 50 in a recoiled position. When the roller track 22 and, correspondingly, the idler wheel 36 are engaged by an obstruction (not shown) causing a sufficient impact force 140 in the rearward direction to deflect the recoil spring 58 (not shown), the impact force 140 causes the idler wheel 36 and the swing arm 78 to rotate in the clockwise direction as shown toward the rear of the machine 10. The impact force 140 is transmitted through the yoke 68 to the recoil shaft 52 and the recoil spring 58 to cause the recoil shaft 52 to move rearward. As the idler wheel recoil assembly 50 moves to the recoiled position, the yoke 68 rotates counterclockwise as viewed relative to the recoil shaft 52 and the swing arm 78. When the idler wheel 36 is past the obstruction and the impact force 140 no longer acts on the idler wheel 36, the recoil spring 58 acts to bias the idler wheel recoil assembly 50 back to the extended position of FIG. 6.

As previously mentioned, control of the idler rise height is important to ensure that the idler wheel 36 is positioned so that the idler wheel 36 begins causing the grousers 28 to penetrate the work surface 26 and the first track roller 38 to finish the penetration. If the idler rise height is too low, buckling of the roller track 22 can occur between the idler wheel 36 and the first track roller 38. If the idler rise height is too high, the total track length in contact with the work surface 26 is shortened which can cause the machine 10 to lose balance. In either situation, the quality of the finish grading performance will be less than optimal. Therefore, control of the idler rise height during operation of the machine 10 over its useful life is desirable for optimal finish grading performance over time.

The idler rise height will vary as the idler wheel 36 and the swing arm 78 rotate about the swing arm-guard shaft 92 during recoil situations and during track tension adjustment when the length of the recoil shaft 52 is varied. Dashed circles in FIG. 7 indicate the arc-shaped path of travel of the idler shaft 96 as the idler wheel recoil assembly 50 moves between the extended and recoiled positions. The change in the idler rise height can be minimized by optimizing the design of the four-bar linkage formed by the roller frame 30, the recoil shaft 52, the yoke 68 and the swing arm 78. For example, the distance between the swing arm-guard shaft 92 and the idler shaft 96 will affect the idler rise height as the idler wheel 36 and the swing arm 78 rotate. Increasing the distance between the shafts 92, 96 will flatten the arc traced by the idler shaft 96 so that the vertical height will change less for a given horizontal travel distance than with a shorter distance between the shafts 92, 96. Other modifications to optimize the design of the four-bar linkage to minimize the change in idler rise height during recoil will be apparent to those skilled in the art and are contemplated by the inventors as having use in idler wheel recoil assemblies 50 in accordance with the present disclosure.

The idler rise height will also change over time as the components of the undercarriage 16 experience wear. The idler wheel 36, the track rollers 38 and the track links 24 of the roller track 22, along with other components, wear down after hours of use traveling over work surfaces 26. The wear in the components brings the idler wheel 36 closer to the work surface 26, and changes as small as 1.0-2.0 mm (0.03937-0.07874 inch) can affect the quality of operations such as finish grading. For this reason, the guard mounting assembly 94 of the idler wheel recoil assembly 50 allows for adjustment of the idler rise height by raising the idler wheel 36 when component wear has lowered the idler wheel 36 to a point where operation of the machine 10 may soon be less than optimal.

Figure 8:
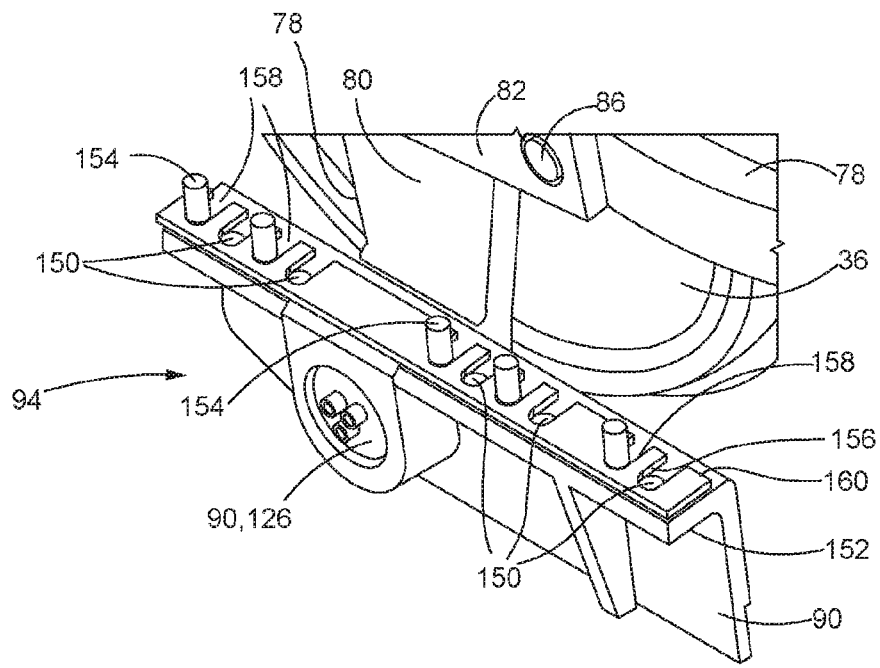
FIG. 8 is an isometric view of an embodiment of a guard mounting assembly in accordance with the present disclosure.

The guard mounting assembly 94 has a plurality of mounting positions for securing the guard 90 to the roller frame 30 and maintaining the guard 90 in a fixed position relative to the roller frame 30. FIG. 8 illustrates the guard mounting assembly 94 with the roller frame 30 removed to show the components of the assembly 94. The guard 90 has a plurality of guard mounting holes 150 spaced along an upper flange 152 of the guard 90. The roller frame 30 has a corresponding plurality of frame mounting holes (not shown) that are spaced along the roller frame 30 to align with the guard mounting holes 150 in a plurality of guard positions as will be discussed further below so that a corresponding fastener 154 can be inserted through pairs of aligned guard mounting holes 150 and frame mounting holes. The assembly 94 further includes at least one guard shim 156 disposed between the guard 90 and the roller frame 30. In some embodiments, the guard shim 156 includes shim holes spaced along the length of the guard shim 156 to align with the guard mounting holes 150 and the frame mounting holes.

Figure 9:
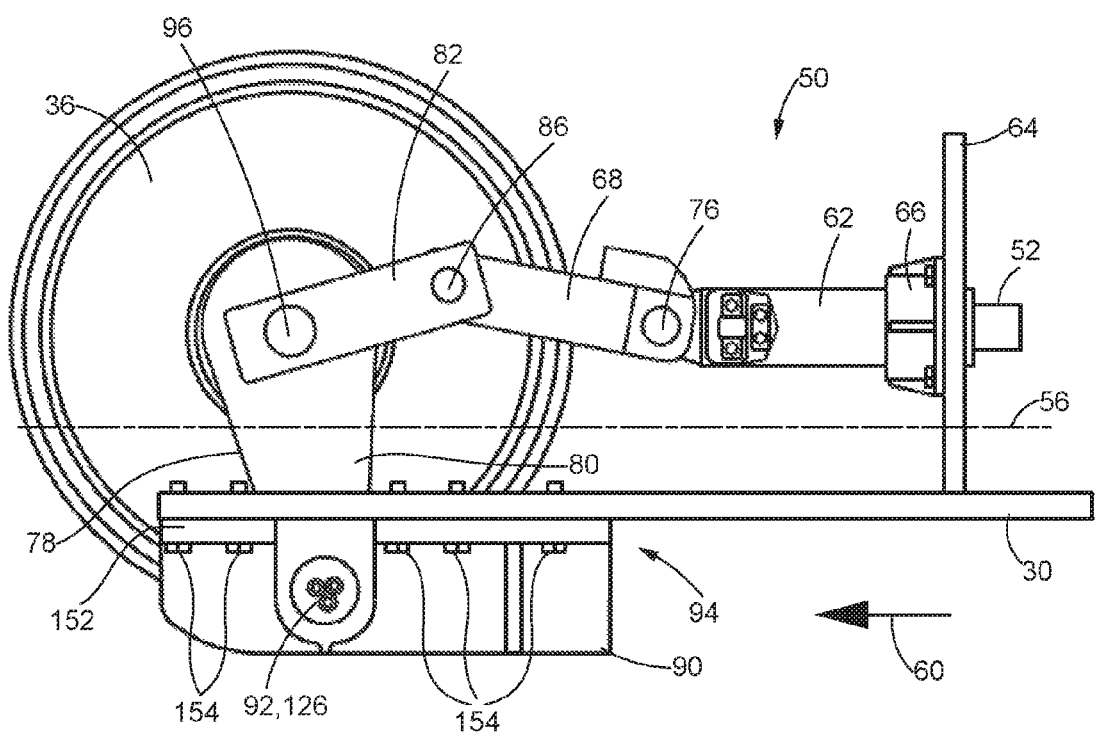
FIG. 9 is a side view of the idler wheel and the idler wheel recoil assembly of FIG. 2 with the guard mounting assembly of FIG. 8 in a raised position.

In the illustrated embodiment, the guard shim 156 includes a plurality of shim mounting slots 158 spaced along the length of the guard shim 156. The shim mounting slots 158 are positioned to align with the guard mounting holes 150 and the frame mounting holes to allow insertion of the fasteners 154. The shim mounting slots 158 have open ends along a side edge 160 of the guard shim 156 that allow the guard shim 156 to be installed between and removed from the roller frame 30 and the guard 90 without removing the fasteners 154 and completely detaching the guard 90 from the roller frame 30. This arrangement simplifies the process for adjusting the idler rise height when necessary. FIG. 6 shows the guard mounting assembly 94 in a first position with one guard shim 156 installed between the roller frame 30 and the guard 90. To increase the idler rise height after wear in the components of the undercarriage 16 has lowered the idler wheel 36, the fasteners 154 may be loosened to separate the guard 90 from the roller frame 30. When the guard 90 is loosened but not detached, the guard shim 156 can slide out from the guard mounting assembly 94 with the fasteners 154 passing through the open ends of the shim mounting slots 158. The fasteners 154 are then retightened to secure the guard 90 in place on the roller frame 30 as shown in FIG. 9. Without the guard shim 156, a guard-frame distance decreases and the guard 90 is higher relative to the roller frame 30. Correspondingly, the idler wheel 36 and the swing arm 78 are raised, and the kinematics of the four-bar linkage may cause the swing arm 78 to rotate clockwise and rearward as the yoke 68 rotates clockwise about the recoil-yoke shaft 76. Depending on the implementation, a plurality of guards shim 156 may be initially installed when the machine 10 is built to provide multiple guard mounting positions and to facilitate multiple incremental adjustments of the idler rise height over time.

Figure 10:
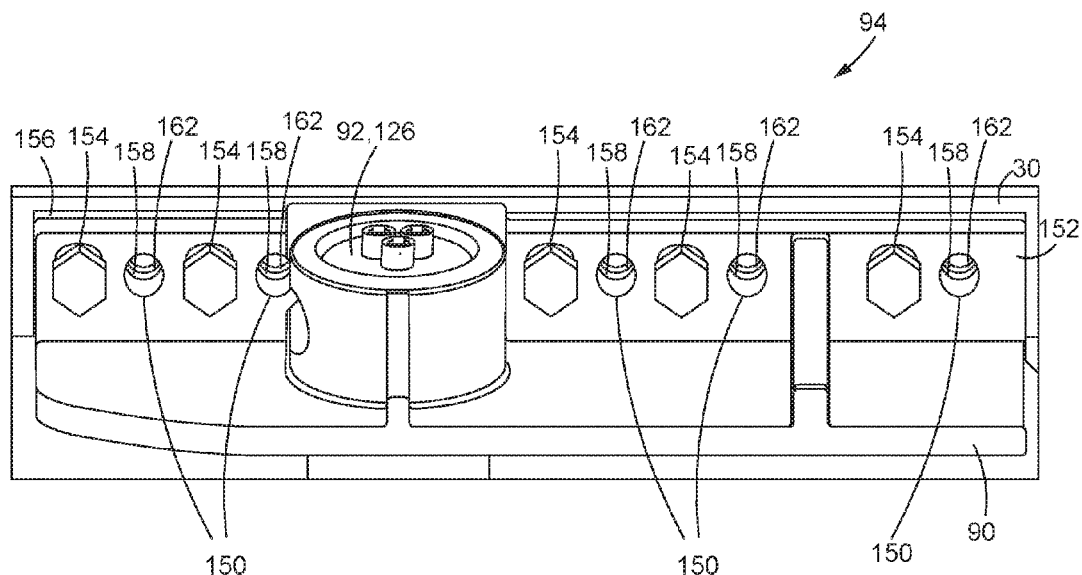
FIG. 10 is an isometric view of an alternative embodiment of a guard mounting assembly in accordance with the present disclosure.

The guard mounting assembly 94 in accordance with the present disclosure may include additional or alternative mechanisms for adjusting the idler rise height of the idler wheel 36. FIG. 10 presents a bottom view of the guard mounting assembly 94. The bottom view illustrates the spacing and alignment of the guard mounting holes 150 in the upper flange 152, the shim mounting slots 158, and a plurality of frame mounting holes 162 in the roller frame 30. The distances between adjacent ones of the holes 150, 162 and the shim mounting slots 158 are approximately equal. This allows the guard 90 to be moved forward and rearward in increments of the distance between the holes 150, 162 and the slots 158 to multiple positions relative to the roller frame 30.

Figure 11:
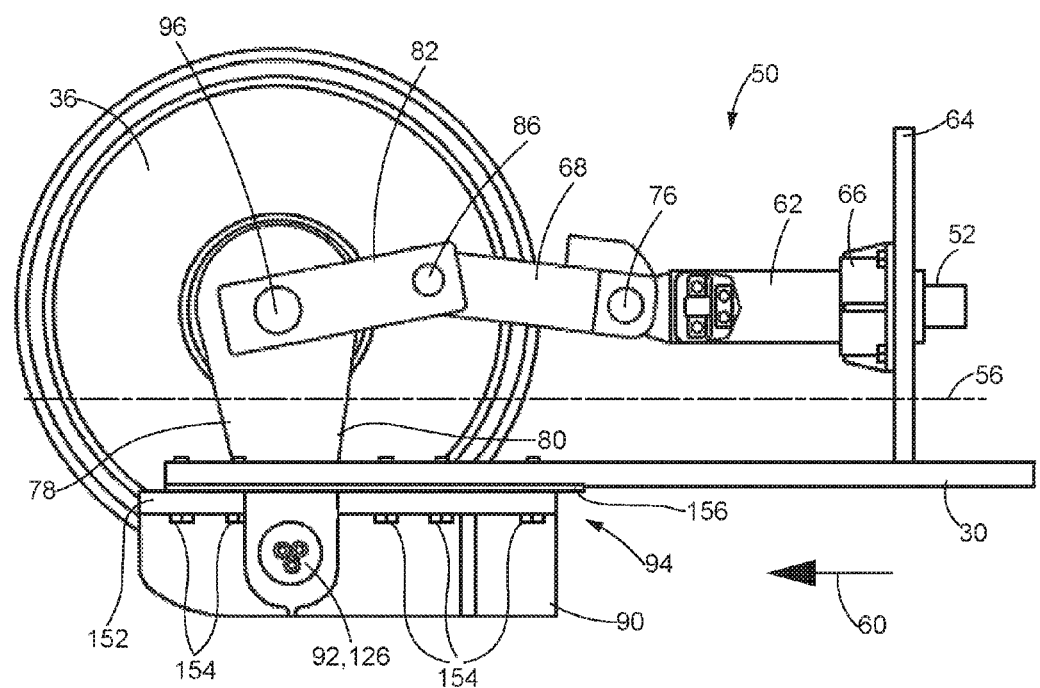
FIG. 11 is a side view of the idler wheel and the idler wheel recoil assembly of FIG. 2 with the guard mounting assembly of FIG. 10 in a raised position.

In FIGS. 6 and 10, the guard 90 is attached to the roller frame 30 at a first guard position. In the first guard position, the idler wheel 36 is disposed at a corresponding first idler rise height, which can be an initial idler rise height when the machine 10 is delivered to the customer. FIG. 11 illustrates the guard mounting assembly 94 with the guard 90 advanced forward to a second guard position. As shown, the guard 90 is moved forward by the distance between adjacent holes 150, 162 (see FIG. 10) and realigned for insertion of the fasteners 154 to secure the guard 90 to the roller frame 30 in the second guard position. With the guard 90 and the swing arm-guard shaft 92 moved forward, the swing arm 78 rotates clockwise and rearward and closer to a vertical orientation. The rotation of the swing arm 78 moves the idler wheel 36 to a second idler rise height that is higher than the first idler rise height. If necessary, the guard 90 may be advanced further forward by increments of the distance between the holes 150, 162 to other guard positions to further adjust the idler rise height

INDUSTRIAL APPLICABILITY

Figure 12:
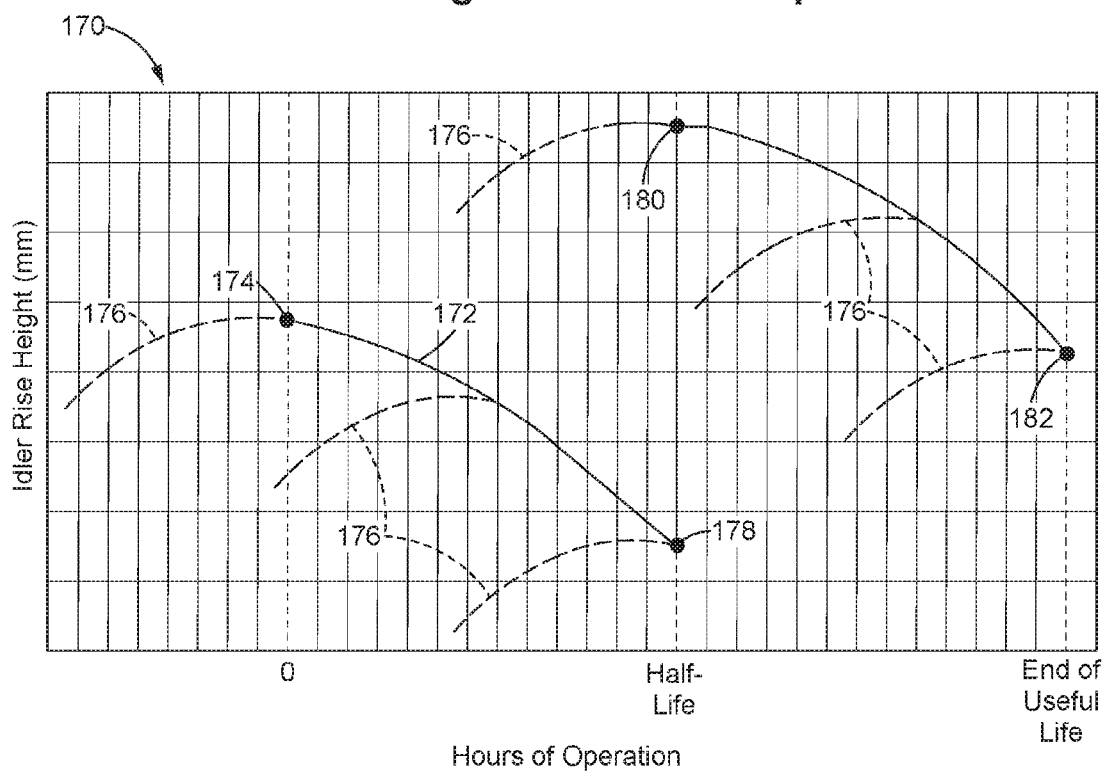
FIG. 12 is a graph of an idler rise height versus hours of operation for a machine implementing the idler wheel and the guard mounting assembly of FIG. 2.

The guard mounting assembly 94 in accordance with the present disclosure can be effective in adjusting the idler rise height as necessary to achieve uniform performance over the life cycle of the machine 10. FIG. 12 illustrates a graph 170 of an exemplary idler rise height adjustment strategy for the machine 10. In the adjustment strategy, the guard mounting assembly 94 is designed to be adjusted once at approximately the designed half-life of the machine 10. At a time 0 at which the machine 10 is placed into service, an idler rise height curve 172 starts at an initial idler rise height 174 where the guard 90 is in a first guard position and one or more guards shim 156 may be disposed between the roller frame 30 and the guard 90.

As the machine 10 is operated to perform tasks such as finish grading, the components of the undercarriage 16 will wear and begin to cause the idler rise height to decrease as indicated by the curve 172. During this time, the idler wheel 36 will encounter obstructions in the work surfaces 26 from time-to-time that will cause the idler wheel 36 to recoil. Recoil curves 176 on the graph 170 indicate exemplary idler rise height changes during recoil incidents. The design of the four-bar linkage of the idler wheel recoil assembly 50 will dictate the actual idler rise height changes that will occur during the recoil events.

The idler wheel 36 will eventually lower to a half-life idler rise height 178 at approximately the half-life of the machine 10. For example, if the useful life of the machine 10 is approximately 2,000 hours, the half-life would be approximately 1,000 hours. At this point, a maintenance schedule for the machine 10 may indicate that an adjustment to the guard mounting assembly 94 may be made. The adjustment may be made by removing one or more guard shims 156, moving the guard 90 forward to a new guard mounting position, making a combination of shim removal and guard repositioning, or making any other appropriate mounting position adjustment of the assembly 94 that will raise the idler rise height. After the adjustment, the idler wheel 36 may have an adjusted half-life idler rise height 180 that will position the idler wheel 36 properly for penetrating the grousers 28 into the work surface 26 while providing an adequate total track length for stability of the machine 10.

After the adjustment to the guard mounting assembly 94 is made, the machine 10 will be placed back into service. Wear of the components of the undercarriage 16 will continue and will lower the idler wheel 36 to an end of life idler rise height 182 at the end of the useful life of the machine 10. In alternative embodiments, the guard mounting assembly 94 may be designed for making multiple incremental adjustments over the useful life of the machine 10. Configured in accordance with the present disclosure, the guard mounting assembly 94 facilitates simple and accurate adjustments of the idler rise height to ensure consistent performance of operations by the machine 10 over its useful life.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An idler wheel recoil assembly for mounting an idler wheel to a roller frame of an undercarriage of a track-type machine having an endless roller track formed by a plurality of track links, the idler wheel recoil assembly comprising:

a recoil shaft slidably mounted on the roller frame for reciprocal linear movement parallel to a longitudinal axis of the undercarriage;

a recoil spring coupled to the roller frame and to the recoil shaft and biasing the recoil shaft toward a forward direction of the track-type machine;

a yoke having a first yoke end and a second yoke end, the first yoke end pivotally connected to the recoil shaft by a recoil-yoke shaft;

a swing arm having a first swing arm end and a second swing arm end, the first swing arm end pivotally connected to the second yoke end of the yoke by a yoke-swing arm shaft, and having the idler wheel pivotally connected thereto by an idler shaft;

a guard pivotally connected to the second swing arm end of the swing arm by a swing arm-guard shaft; and a guard mounting assembly connecting the guard to the roller frame of the undercarriage, the guard mounting assembly having a plurality of mounting positions for securing the guard to the roller frame and maintaining the guard in a fixed position relative to the roller frame, and wherein an idler rise height of the idler wheel relative to the roller frame is different when the guard is secured to the roller frame in each of the plurality of mounting positions of the guard mounting assembly.

2. The idler wheel recoil assembly of claim 1, wherein the guard mounting assembly comprises:

at least one guard shim disposed between the guard and the roller frame; and a plurality of fasteners securing the guard to the roller frame with the at least one guard shim disposed there between, wherein the idler rise height of the idler wheel increases when one of the at least one guard shim is removed and a guard-frame distance between the guard and the roller frame decreases.

3. The idler wheel recoil assembly of claim 2, wherein the swing arm rotates rearward when the one of the at least one guard shim is removed and the guard-frame distance decreases.

4. The idler wheel recoil assembly of claim 2, wherein the at least one guard shim comprises a plurality of guard shims.

5. The idler wheel recoil assembly of claim 2, wherein the guard has a plurality of guard mounting holes and the roller frame has a plurality of frame mounting holes that are aligned with the plurality of guard mounting holes when the guard is mounted to the roller frame, and a corresponding one of the plurality of fasteners is inserted through each pair of aligned guard mounting holes and frame mounting holes, and wherein each of the at least one guard shim comprises a plurality of shim mounting slots that each align with one pair of aligned guard mounting holes and frame mounting holes and the corresponding one of the plurality of fasteners so that the at least one guard shim is installable between the guard and the roller frame and removable from the guard mounting assembly without completely detaching the guard from the roller frame.

6. The idler wheel recoil assembly of claim 1, wherein the guard mounting assembly comprises:

a plurality of frame mounting holes through the roller frame;

a plurality of guard mounting holes through the guard, wherein the plurality of guard mounting holes are positioned to align with the plurality of frame mounting holes in multiple positions of the guard relative to the roller frame; and a plurality of fasteners for securing the guard to the roller frame with each of the plurality of fasteners being inserted through an aligned pair of one of the plurality of frame mounting holes and one of the plurality of guard mounting holes, wherein the idler wheel is disposed at a first idler rise height relative to the roller frame when the guard is mounted to the roller frame in a first guard position with the plurality of guard mounting holes aligned with the plurality of frame mounting holes, and the idler wheel is disposed at a second idler rise height relative to the roller frame that is higher than the first idler rise height when the guard is mounted to the roller frame in a second guard position with the plurality of guard mounting holes aligned with the plurality of frame mounting holes.

7. The idler wheel recoil assembly of claim 6, wherein the swing arm rotates rearward relative to the roller frame when the guard is repositioned from the first guard position to the second guard position.

8. The idler wheel recoil assembly of claim 6, wherein the second guard position is forward of the first guard position relative to the roller frame.

9. The idler wheel recoil assembly of claim 1, wherein the recoil shaft comprises a track adjustment cylinder having a variable track adjustment cylinder length so that the recoil shaft has a variable recoil shaft length for adjustment of tension in the endless roller track.

10. The idler wheel recoil assembly of claim 1, comprising:

a recoil-yoke composite bearing mounted on the recoil-yoke shaft between the recoil-yoke shaft and the recoil shaft and reducing friction there between without lubricant;

a yoke-swing arm composite bearing mounted on the yoke-swing arm shaft between the yoke-swing arm shaft and the second yoke end and reducing friction there between without lubricant; and a swing arm-guard composite bearing mounted on the swing arm-guard shaft between the swing arm-guard shaft and the second swing arm end and reducing friction there between without lubricant.

11. A guard mounting assembly for mounting an idler wheel to a roller frame of an undercarriage of a track-type machine having an endless roller track formed by a plurality of track links, wherein the idler wheel is pivotally connected to a swing arm of a recoil assembly by an idler shaft, with the swing arm having a first swing arm end pivotally connected to a yoke of the recoil assembly and a second swing arm end, the guard mounting assembly comprising:

a guard pivotally connected to the second swing arm end of the swing arm by a swing arm-guard shaft;

at least one guard shim; and a plurality of fasteners securing the guard to the roller frame with the at least one guard shim disposed there between, wherein an idler rise height of the idler wheel increases when one of the at least one guard shim is removed and a guard-frame distance between the guard and the roller frame decreases.

12. The guard mounting assembly of claim 11, wherein the swing arm rotates rearward when the one of the at least one guard shim is removed and the guard-frame distance decreases.

13. The guard mounting assembly of claim 11, wherein the at least one guard shim comprises a plurality of guard shims.

14. The guard mounting assembly of claim 11, wherein the guard has a plurality of guard mounting holes and the roller frame has plurality of frame mounting holes that are aligned with the plurality of guard mounting holes when the guard is mounted to the roller frame, and a corresponding one of the plurality of fasteners is inserted through each pair of aligned guard mounting holes and frame mounting holes, and wherein each of the at least one guard shim comprises a plurality of shim mounting slots that each align with one pair of aligned guard mounting holes and frame mounting holes and the corresponding one of the plurality of fasteners so that the at least one guard shim is installable between the guard and the roller frame and removable from the guard mounting assembly without completely detaching the guard from the roller frame.

15. The guard mounting assembly of claim 11, comprising a swing arm-guard composite bearing mounted on the swing arm-guard shaft between the swing arm-guard shaft and the second swing arm end and reducing friction there between without lubricant.

16. A guard mounting assembly for mounting an idler wheel to a roller frame of an undercarriage of a track-type machine having an endless roller track formed by a plurality of track links, wherein the idler wheel is pivotally connected to a swing arm of a recoil assembly by an idler shaft, with the swing arm having a first swing arm end pivotally connected to a yoke of the recoil assembly and a second swing arm end, the guard mounting assembly comprising:
　a guard pivotally connected to the second swing arm end of the swing arm by a swing arm-guard shaft and having a plurality of guard mounting holes there through;
　a plurality of frame mounting holes through the roller frame, wherein the plurality of guard mounting holes are positioned to align with the plurality of frame mounting holes in multiple positions of the guard relative to the roller frame; and
　a plurality of fasteners for securing the guard to the roller frame with each of the plurality of fasteners being inserted through an aligned pair of one of the plurality of frame mounting holes and one of the plurality of guard mounting holes, wherein the idler wheel is disposed at a first idler rise height relative to the roller frame when the guard is mounted to the roller frame in a first guard position with the plurality of guard mounting holes aligned with the plurality of frame mounting holes, and the idler wheel is disposed at a second idler rise height relative to the roller frame that is higher than the first idler rise height when the guard is mounted to the roller frame in a second guard position with the plurality of guard mounting holes aligned with the plurality of frame mounting holes.

17. The guard mounting assembly of claim 16, wherein the swing arm rotates rearward relative to the roller frame when the guard is repositioned from the first guard position to the second guard position.

18. The guard mounting assembly of claim 16, wherein the second guard position is forward of the first guard position relative to the roller frame.

19. The guard mounting assembly of claim 18, wherein the idler wheel is disposed at a third idler rise height relative to the roller frame that is higher than the second idler rise height when the guard is mounted to the roller frame in a third guard position that is forward of the second guard position relative to the roller frame with the plurality of guard mounting holes aligned with the plurality of frame mounting holes.

20. The guard mounting assembly of claim 16, comprising a swing arm-guard composite bearing mounted on the swing arm-guard shaft between the swing arm-guard shaft and the second swing arm end and reducing friction there between without lubricant.

\* \* \* \* \*